United States Patent [19]

Smith

[11] Patent Number: 5,378,471
[45] Date of Patent: Jan. 3, 1995

[54] NUTRITIVE FEED BINDER

[75] Inventor: David Morgan Smith, Kearneysville, W. Va.

[73] Assignee: Martin Marietta Magnesia Specialties Inc., Raleigh, N.C.

[21] Appl. No.: 161,989

[22] Filed: Dec. 3, 1993

Related U.S. Application Data

[63] Continuation of Ser. No. 926,080, Aug. 5, 1992, abandoned.

[51] Int. Cl.6 ............................................. A23K 1/165
[52] U.S. Cl. ...................................... 424/442; 426/72; 426/74; 426/623; 426/630; 426/635; 426/658
[58] Field of Search ..................... 414/442; 426/74, 72, 426/623, 630, 635, 658

[56] References Cited

U.S. PATENT DOCUMENTS

| | | | |
|---|---|---|---|
| 2,512,537 | 4/1947 | Zellers | 426/74 |
| 4,016,296 | 4/1977 | Desantis | 426/658 |
| 4,027,043 | 5/1977 | Schroeder | 426/658 |
| 4,171,385 | 10/1979 | Skoch | 426/623 |
| 4,265,916 | 5/1981 | Skoch et al. | 426/74 |
| 4,431,675 | 2/1984 | Schroeder et al. | 426/69 |
| 4,775,539 | 10/1988 | Van de Walle | 426/626 |
| 4,957,769 | 9/1990 | Theuninck et al. | 426/630 |
| 4,994,282 | 2/1991 | Miller | 426/74 |

*Primary Examiner*—D. Gabrielle Phelan
*Attorney, Agent, or Firm*—Gay Chin; Bruce M. Winchell

[57] ABSTRACT

A binder composition particularly well suited for pelleted and compressed aquatic animal feeds comprising: 10–17%, by weight a reactive metal source; 25–35%, by weight, a reactive metal oxide or hydroxide; 18–28%, by weight, sugar and 28–42%, by weight, corn syrup solids. The binder composition produces feeds with lower calcium and magnesium concentrations that typically utilized binders.

10 Claims, No Drawings

NUTRITIVE FEED BINDER

This application is a continuation, of application Ser. No. 07/926,080, filed Aug. 5, 1992, now abandoned.

FIELD OF THE INVENTION

The present invention relates to a nutritive binder useful in pelleted and compressed animal feeds and especially well suited for use in aquatic animal feeds.

BACKGROUND OF THE INVENTION

Pelleted feeds have been successfully utilized in the feeding of fish and animals including monogastric and ruminant animals, fish, shrimp and the like. The advantages of pelleted feeds include: (1) pelleted feeds prevent selective feeding on those ingredients in the formulation which are more palatable and thus more desirable to the animal; (2) pelleting of the feed ration prevents segregation of the various size and density constituents that are inherent in animal feeds; (3) pelleting animal feed results in higher bulk density, which is advantageous for both shipping and handling, resulting in maximum load efficiency and reduced storage requirements; and (4) pelleting also increases nutritional utilization of the feed components, thus increasing conversion rate of the feed formulation.

Generally pelleted feeds are produced in an extrusion type thermoplastic molding operation in which finely divided particles of a feed ration are formed into compact, easily handled pellets. Binder additives may be utilized to improve the strength, durability and stability of the pellets, and to reduce fines produced during the pelleting process. Preferably, nutritive binder additives are utilized which in addition to providing these improvements also provide essential recognized nutrients such as magnesium, calcium, potassium and/or sulfur to the feed.

Pellet stability is particularly important in the production and use of pelleted feeds for fish, shrimp and other water animals. Because shrimp, and other water animals, eat slowly and masticate feed pellets outside their mouth parts, much of the pellet is lost through leaching and fragmentation of the pellet by the water. In addition to representing a waste of feed, the fragmentation and leaching of the pellet contributes to the degradation of the water quality in the feeding pond.

U.S. Pat. No. 4,775,539, the disclosure of which is incorporated by reference, discloses a nutritive teed binder that produces pelleted feeds with improved stability and therefore is advantageous for use in fish and water animal feeds.

Pelleted feeds may also be degraded by high temperatures, e.g. above 100° F., and high humidity, e.g. above 95%. Either of these conditions may cause the pellets to separate and fragment.

Heretofore generally known pellet binders include mixtures of a reactive metal salt and reactive metal hydroxide. When a calcium salt is utilized as the reactive metal salt, or when calcium forms a part of the reactive metal hydroxide, the calcium concentration of the pelleted feed will be increased. Certain species, such as shrimp, may be harmed by feeding on a pelleted feed with a high calcium content, for example greater than about 20%. Similarly, if magnesium forms a part of the metal salt or metal hydroxide, the magnesium concentration of the pelleted feed will be increased. Increased magnesium levels could also prove harmful to certain species. Thus, binders with too great a concentration of calcium or magnesium may prove disadvantageous for certain uses.

SUMMARY OF THE INVENTION

The present invention comprises an improved chemically reactive binder-additive for densifying and bonding finely divided feed particles that provides essential recognized nutrients such as magnesium, calcium, potassium and/or sulfur to the finished feed formulation. In comparison with heretofore generally known binder compositions, the binder of the present invention has improved binding capabilities and produces feeds with lower calcium and magnesium levels. The calcium contribution to feeds produced using the binder of the present invention is not greater than 0.066% when used at 0.5%, preferably not greater than 0.33%, when used at 2.5%. The magnesium contribution to feeds produced using the binder of the present invention is not greater than 0.053%, preferably not greater than 0.26%. Thus feeds produced using the binder of the present invention have lower calcium and magnesium levels than feeds produced with binders typical of the prior art.

The improved binding capabilities of the binder of the present invention allows the production of feeds with a lower binder content thereby further reducing the calcium and magnesium content of the feed. The improved binding capabilities of the binder of the present invention also improve the ability of feeds to resist degradation and fragmentation.

The binder of the present invention also imparts a lower pH to water than heretofore known binders. Thus, when used in aquatic animal feeds, the binder of the present invention helps to prevent the formation of ammonia in the feeding pool.

The binder of the present invention is able to withstand high temperatures, up to 100° F., and high humidity better than generally known binders.

A binder as set forth herein performs equally well when the feed materials are subjected to pelleting, or when the feed/binder mixture is subject to mechanical densification to form blocks and briquettes. In contrast, the binders of the prior art are less efficiently utilized for both pelleting (extrusion) and mechanical densification (blocking or briquetting). Accordingly, while a generally utilized method for animal feed pelleting is described herein, it is to be understood that the present invention is also useful for other methods of extruding or mechanically shaping feed materials.

DETAILED DESCRIPTION OF THE INVENTION

The chemically reactive feed binder composition of the present invention comprises 10-17%, by weight a reactive metal source, hereinafter referred to as a "reactive salt"; 25-35%, by weight, a reactive metal oxide or hydroxide; 18-28%, by weight, sugar and 28-42%, by weight, corn syrup solids. Preferably the binder composition of the present invention comprises: 14-17%, by weight a reactive salt; 28-34%, by weight, a reactive metal oxide or hydroxide; 20-25%, by weight, sugar and 39-35%, by weight, corn syrup solids. More preferably, the binder composition of the present invention comprises: 16%, by weight a reactive salt; 32%, by weight, a reactive metal oxide or hydroxide; 22%, by weight, sugar and 30%, by weight, corn syrup solids. The reactive salts and reactive metal oxides or hydroxides provide nutrient value to the feed formulation produced using the binder.

Suitable reactive salts for use in the present invention include, but are not limited to, calcium chloride, magnesium chloride, potassium magnesium sulfate, potassium sulfate, magnesium sulfate or mixtures of these compounds. Preferably the reactive salt utilized is potassium magnesium sulfate.

Suitable reactive metal oxides or hydroxides for use in the present invention include, but are not limited to, calcium magnesium oxide (dolime), calcium oxide, magnesium oxide, magnesium hydroxide, calcium hydroxide or magnesium calcium hydroxide. Preferably the reactive metal oxide or hydroxide is dolime (calcium magnesium oxide).

The reactive salts and reactive metal oxides or hydroxides chosen for use in the present invention should be of a sufficient purity level to meet feed grade requirements. Higher purity levels such as technical grade or food grade are also appropriate for use in the present invention. Additionally the reactive salts and reactive metal oxides or hydroxides should be approved for use in animal feed products.

The particle size of the reactive salts and reactive metal oxides or hydroxides can range from not greater than 16 mesh U.S. sieve scale to about 325 mesh. The preferred size range is from about 50 mesh to about 325 mesh.

The preferred reactive metal oxide for use in the present invention is calcium magnesium oxide (dolime). Dolime is the product of the calcination of dolomite limestone ($CaCO_3$ $MgCO_3$). Dolomite limestone can be calcined by a variety of methods known to those of ordinary skill in the art. Regardless of the method of calcination, the binder of the present invention can utilize high purity dolime that has been calcined in the temperature range from about 950° C. to about 1550° C. Calcined high purity dolime generally ranges in analysis from approximately 40 to 42 percent MgO and 56 to 58 percent CaO. Typical dolime surface area for the purpose of this invention would range from 0.1 sq.m/g (square meters per gram) to approximately 8 sq.m/g as measured by the B.E.T. surface area method.

The sugars suitable for use in the binder of the present invention include any of the mono, di, tri and polysaccharides known to those skilled in the art. Preferably the sugar is cane or beet sugar.

The corn syrup solids suitable for use in the present invention are commercially available from the Carnation Company, Products Division, Jacksonville, Ill. and Nestle Foods Corporation, Purchase, N.Y.

Thus a preferred binder composition of the present invention comprises:
14–17%, by weight potassium magnesium sulfate;
28–34%, by weight, dolime;
20–25%, by weight sugar and
29–35%, by weight corn syrup solids.

A more preferred binder composition of the present invention comprises:
16%, by weight potassium magnesium sulfate;
32%, by weight, dolime;
22%, by weight sugar and
30%, by weight corn syrup solids.

The components of the binder of the present invention may be mixed to obtain a uniform blend of materials prior to the binder composition being added to the total feed formulation. Alternatively, the components of the binder of the present invention may be added admixed individually into the feed formulation that is to be pelleted providing that sufficient mixing is available to completely disperse the components of the binder of the present invention throughout the feed mixture prior to pelleting.

The binder composition of the present invention may be added to the feed formulation in any amount necessary to produce pelleted or compressed feeds. However, an advantage of the binder composition of the present invention is that its use in small amounts is sufficient to produce pelleted or compressed feeds that reduce degradation and fragmentation. Thus, the binder composition of the present invention generally will be incorporated into feed formulations in an amount up to 2.5% by weight of the feed formulation. Preferably the binder composition of the present invention will comprise 0.5 to 1.5%, by weight of the feed formulation.

The feed compositions produced utilizing the binder of the present invention will typically comprise 0.025 to 0.425 percent by weight the reactive metal source; 0.0125 to 0.875 percent by weight the reactive metal oxide or hydroxide, 0.045 to 0.70 percent by weight sugar and 0.14 to 1.05 percent by weight the corn syrup solids.

In the feed pelleting process, various feed ingredients including, but not limited to, dehydrated alfalfa, barley, beet pulp, blood mean, bone meal, brewers grain, buttermilk, citrus pulp, coconut meal, cod liver oil, corn, corn cob and mean, corn gluten feed, corn gluten meal, corn oil meal, cottonseed meal, distillers grain, distillers solubles, fish meal, fish oil, flour, hominy, kafir corn, kafir head chop, lecithin, linseed meal, meat scrap, milo maize, milo head chop, molasses, oats, oat hulls, oat screening, peanut meal, rice bran, rice polishings, shrimp meal, soybean meal, squid meal, wheat, wheatraids, wheat flour, wheat bran, whey, bone meal and/or urea, are uniformly mixed. In addition, minerals and mineral supplements and various drug and drug combinations may also be incorporated.

In the practical application and use of this invention, the binder composition of the present invention is added to the formulation containing various ground feed ingredients, minerals, vitamins, and drug additives. The complete mixture is usually blended in a ribbon mixer or vertical mixer in two or three ton batches. Each batch is then delivered to overhead bins above the pellet mill.

The mixture of ingredients, or meal mixture, flows by gravity into a flow rate regulator called a feeder, which provides a constant feed rate to the conditioning chamber. In the conditioning chamber, the entire meal mixture is subjected to steam prior to the actual pelleting step. Most liquids which may be introduced into the formulation, such as molasses, are also added through the conditioning chamber. Steam conditioning supplies moisture for lubrication, and partly gelatinized starches. Steam addition at this point in the process also aids in solubilizing any soluble reactive salt component of present invention, thus increasing the rate of reaction of the binder combination. The amount of total moisture which is contained in the feed mixture is raised to a level normally of from about 12 percent to 16 percent, by weight, of the feed formulation, as a result of liquid and steam addition.

The temperature of the teed is raised about 10° to 66° C. above the ambient temperature as a result of steam addition, which also increases the rate of reaction of the binder ingredients.

Pelleting of the feed is next accomplished by gravity flow of the steam conditioned feed ingredients, now called mash, into the pellet mill die chamber. In the die chamber, usually two or three rollers push the softened mash through holes in a circular die. Typical hole diameter in these dies is 3/32 inch to 5/16 inch. gives positioned outside the die then cut the extruded densifted pellet to proper length. Alternate die types may produce pellets of variable shapes, including cubes, squares, and large diameter round pellets.

Typical formed pellet temperature usually ranges from about 66° C. to about 100° C. Hot pellets are usually cooled by forced air through vertical or horizontal cooling systems to near ambient temperature.

The binder composition of the present invention is particularly well suited for use in the formulation of aquatic animal feeds, such as shrimp feeds where its enhanced binding capabilities and low calcium content are particularly advantageous.

The features and advantageous of the binder composition of the present invention will become even more apparent from the following examples.

EXAMPLE 1

This example illustrates the advantages of using the binder compositions of the present invention in pelleted feed formulations.

Four binder compositions of the present invention, A-D, were prepared by admixing the ingredients set forth in Table 1 in the amounts indicated.

TABLE 1

| Ingredient | Binder A | Binder B | Binder C | Binder D |
|---|---|---|---|---|
| Corn Syrup Solids | 40 grams | 30 grams | 30 grams | 35 grams |
| Sugar | 20 grams | 25 grams | 20 grams | 25 grams |
| Cal. mag. oxide (Dolime) | 27.5 grams | 30 grams | 33.5 grams | 27.5 gram |
| Potassium magnesium sulfate | 12.5 grams | 15 grams | 16.5 grams | 12.5 gram |

The calcium concentration of each Binder was determined by Atomic Absorption Spectroscopy. The results were as follows:

| Binder | Calcium Concentration |
|---|---|
| A | 10.8% |
| B | 11.7% |
| C | 13.2% |
| D | 10.9% |

Test were performed to determine the water stability of feed formulations produced using the Binder Compositions A-D compared to control tests using no binder and a commercially available binder. Feed formulations were produced by admixing the ingredients set forth in Table 2 in the amounts shown.

TABLE 2

| Ingredient | Pelleted Feeds (PF) | | | | | |
|---|---|---|---|---|---|---|
| | PF-A | PF-B | PF-C | PF-D | PF-E | PF-F |
| Ground wheat | 20 g | 20 g | 20 g | 20 g | 20 g | 20 g |
| Wheat flour | 5 g | 5 g | 5 g | 5 g | 6 g | 3 g |
| Fish meal | 30.5 g | 30.5 g | 30.5 g | 30.5 g | 30.5 g | 30.5 g |
| Soy meal | 35 g | 35 g | 35 g | 35 g | 35 g | 35 g |
| Biophos | 1.5 g | 1.5 g | 1.5 g | 1.5 g | 1.5 g | 1.5 g |
| Cod Liver Oil | 2.5 g | 2.5 g | 2.5 g | 2.5 g | 2.5 g | 2.5 g |
| Lecithin | 1.5 g | 1.5 g | 1.5 g | 1.5 g | 1.5 g | 1.5 g |
| Water | 3 g | 3 g | 3 g | 3 g | 3 g | 3 g |
| Binder | 1 g of A | 1 g of B | 1 g of C | 1 g of D | 0 | 3 g of Pel-plus 250A | g = grams
Pel-plus 250A = a binder composition produced and sold by Martin Marietta Corporation, Bethesda, Maryland. This binder composition is described in U.S. Pat. No. 4,775,539.
Biophos = a chemical mixture of monocalcium and dicalcium phosphate produced and sold by Pitman-Moore, Inc., Mundelein, Il.

10 pellets were prepared from each of the feed compositions PF-A through PF-F by taking 10 g of the teed and pressing the composition on a speed press with a 1 inch die at 180° F. for 60 seconds. The pellets were then dried at 110° C. for 1.5 hours in a drying oven. The average weight of the pellets produced from each feed formulation was as follows:

| Pelleted Feed | Avg. Weight of Pellets |
|---|---|
| PF-A | 8.85 grams |
| PF-B | 9.49 grams |
| PF-C | 9.57 grams |
| PF-D | 9.21 grams |
| PF-E | 8.90 grams |
| PF-F | 9.20 grams. |

The water stability of each pelleted feed composition was evaluated using the following test procedure. A platform is made in a 5 gallon bucket using three 8 inch long bolts spaced equidistant around the circumference of the bucket and screwed into the bucket, at a point about halfway down the side of the bucket, so that each touch. 5 aquarium air stones are mounted inside the bucket at the bottom, with air line tubing attached through holes drilled to fit each air stone through the bottom of the bucket. All the air line tubing is connected to a 5 way gang valve that is singly connected to an air outlet valve.

Approximately 73±3.0 grams of pelleted feed from each of these feed compositions were placed into individual 1 pint plastic jars to hold each set of pellets during the test. Each jar has six ¼ inch diameter holes drilled into the top and bottom, arranged so an even amount of air can pass between the pellets. Each jar is marked to correspond to the pellets utilized in the test.

The jars containing the pellets are placed onto a Number 6, full height screen sieve. The bucket is filled with warm tap water (approximately 70° F.) to about 2 inches from the top of the bucket. The air outlet valve is opened so that enough air is passed through the air stones to produce an even layer of air bubbles on the surface of the water.

The screen sieve containing the jars is lowered down to the platform in the bucket and the bucket is covered with a lid. The container is left covered for 6 hours with the air running.

After 6 hours the air outlet valve is turned off and the water is carefully drained from the container. The screen sieve is removed from the bucket and the jars removed from the screen. The jars are opened and any salvageable pellet is removed from the jars and placed into a drying oven at 110° C. for 24 hours. Then the pellets are re-weighed and the percentage weight loss for each pellet is calculated.

Using this procedure each of the pelleted feed formulations PF-A through PF-F was tested. The average percentage weight loss for the pellets from each formulation was as follows:

| Pelleted Feed | Avg. % Weight Loss of Pellets |
|---|---|
| PF-A | 6.85% |
| PF-B | 8.40% |
| PF-C | 8.81% |
| PF-D | 8.59% |
| PF-E | 11.33% |
| PF-F | 8.41% |

These results indicate that the pelleted feeds produced utilizing the binder composition of the present invention have improved water stability properties as compared to a pelleted feed produced without a binder composition (PF-E).

The pH imparted to water containing each pelleted feed formulation was also determined by placing a feed pellet in tap water and then measuring the pH after ½ hour. The results were as follows:

| Pelleted Feed | pH |
|---|---|
| PF-A | 8.04 |
| PF-B | 8.02 |
| PF-C | 7.98 |
| PF-D | 7.92 |
| PF-E | 7.87 |
| PF-F | 8.81 |

These results indicate that pelleted feed compositions produced with the binder compositions of the present invention impart lower pH to water than pelleted feed compositions produced with the binder composition of U.S. Pat. No. 4,775,539.

EXAMPLE 2

This example illustrates the advantages of utilizing the binder composition of the present invention in a shrimp feed formulation.

A binder composition (G) of the present invention was prepared by admixing the following ingredients in the amounts indicated:

| Ingredient | Amount |
|---|---|
| Corn Syrup Solids | 30 grams |
| Sugar | 22.5 grams |
| Calcium magnesium oxide (Dolime) | 31.75 grams |
| Potassium magnesium sulfate | 15.75 grams |

This binder composition was utilized in varying amounts in a shrimp feed formulation to produce shrimp feed formulations containing 0.5%, by weight, binder G, 1.0%, by weight, binder G and 1.5%, by weight, binder G. For comparison purposes shrimp feed formulations containing 4%, by weight, Pelplus 250A binder (manufactured and sold by Martin Marietta Corporation, Bethesda, Md. and described in U.S. Pat. No. 4,775,539); and 3%, by weight wheat gluten as a binder were also prepared.

The shrimp feed formulations, SF-1 through SF-5 based on PDM-46 were prepared by admixing the ingredients set forth in Table 3. The amount of each ingredient is set forth in percentage by weight of the feed formulation.

TABLE 3

| | Shrimp Feed Formulations | | | | |
|---|---|---|---|---|---|
| Ingredient | SF-1 % | SF-2 % | SF-3 % | SF-4 % | SF-5 % |
| Anchovy fish meal | 29.8 | 29.8 | 29.8 | 29.8 | 29.8 |
| Shrimp meal (33%) | 14.9 | 14.9 | 14.9 | 14.9 | 14.9 |
| Squid meal (69%) | 5.0 | 5.0 | 5.0 | 5.0 | 5.0 |
| Soybean meal (48%) | 14.9 | 14.9 | 14.9 | 14.9 | 14.9 |
| Wheat feed flour | 14.9 | 14.9 | 14.9 | 14.9 | 14.9 |
| Wheat, mill run | 3.9 | 3.9 | 3.9 | 3.9 | 3.9 |
| Wheat, mids | 5.0 | 5.0 | 5.0 | 5.0 | 5.0 |
| Fish oil | 2.0 | 2.0 | 2.0 | 2.0 | 2.0 |
| Lecithin | 1.0 | 1.0 | 1.0 | 1.0 | 1.0 |
| Cholesterol | 0.1 | 0.1 | 0.1 | 0.1 | 0.1 |
| Pel-plus 250 A | 4.0 | 0.0 | 0.0 | 0.0 | 0.0 |
| Binder G | 0.0 | 0.5 | 1.0 | 1.5 | 0.0 |
| Wheat Gluten | 0.0 | 0.0 | 0.0 | 0.0 | 3.0 |
| Stay-C (dry) | 0.5 | 0.5 | 0.5 | 0.5 | 0.5 |
| Vitamin mix | 2.0 | 2.0 | 2.0 | 2.0 | 2.0 |
| Mineral mix | 1.0 | 1.0 | 1.0 | 1.0 | 1.0 |
| Diatomaceous earth | 1.0 | 4.5 | 4.0 | 3.5 | 2.0 |
| TOTAL | 100 | 100 | 100 | 100 | 100 |

Vitamin mix=AIN-76 Vitamin Mix containing: (mg/kl of mix) thiamine hydrochloride, 600; riboflavin, 600; pyridoxine hydrochloride, 700; nicotinic acid (niacin), 3000; D-calcium pantothenate, 1600; folic acid, 200; D-biotin, 20; cyanocobalamin (vitamin $B_{12}$), 1; retinyl palmitate (vitamin A pre-mix at 250 IU/mg), 1600; DL-a-tocopherol acetate (Vit. E at 0.25 IU/mg), 20,000; cholecalciferol (vitamin D at 400 IU/mg), 250; menaguinone (vitamin K), 5; sucrose, 972,900.

Mineral mix=(gms/kg of mix) calcium carbonate, 21; calcium phosphate dibasic, 735; citric acid, 2.27; cupric citrate, 0.46; ferric citrate (16–17% Fe), 5.58; magnesium oxide, 25; manganese citrate, 8.35; potassium iodide, 0.01; potassium phosphate dibasic, 81; potassium sulfate, 68; sodium chloride, 30.6; sodium phosphate, 21.4: zinc citrate, 1.33. The prepared shrimp feeds were pelleted in conventional commercial fashion, through a 2 millimeter die.

Pellets from each shrimp feed formulation were put into aleionized water to measure the increase in the water's pH. 5 grams of feed pellets were added to 250 ml of aleionized water with an initial pH of 5.60. pH measurements were recorded after 5, 15 and 30 minutes. The results were as follows:

| | Shrimp Feed Formulation | | | | |
|---|---|---|---|---|---|
| Time | SF-1 | SF-2 | SF-3 pH | SF-4 | SF-5 |
| 5 min. | 8.83 | 6.82 | 6.80 | 6.99 | 7.03 |
| 15 min. | 9.55 | 7.21 | 7.24 | 7.55 | 7.40 |

-continued

| Time | Shrimp Feed Formulation | | | | |
|---|---|---|---|---|---|
| | SF-1 | SF-2 | SF-3 | SF-4 | SF-5 |
| | | | pH | | |
| 30 min. | 10.30 | 7.65 | 7.59 | 7.83 | 7.50 |

The calcium and magnesium levels of each of the teed formulations was determined by Atomic Absorption Spectroscopy. The results were as follows:

| | Shrimp Feed Formulation | | | | |
|---|---|---|---|---|---|
| | SF-1 | SF-2 | SF-3 | SF-4 | SF-5 |
| % Calcium | 4.71 | 3.64 | 3.55 | 3.71 | 3.37 |
| % Magnesium | 0.94 | 0.30 | 0.33 | 0.38 | 0.25 |

The water stability of each shrimp feed formulation was determined by the procedure set forth in Example 1. The percentage of dry matter remaining in each pellet was evaluated at 1, 2, 4 and 8 hours. The results were as follows:

| Shrimp Feed | Percent Dry Matter Remaining | | | |
|---|---|---|---|---|
| | 1 Hour | 2 Hour | 4 Hour | 8 Hour |
| SF-1 (Pel-plus 250A) | 92.2 ± 3.0 | 90.6 ± 0.7 | 90.4 ± 2.6 | 85.3 ± 3.4a |
| SF-2 (0.5% Binder G) | 92.9 ± 6.0a | 93.1 ± 1.3a | 92.3 ± 2.2a | 85.6 ± 2.6a |
| SF-3 (1.0% Binder G) | 88.5 ± 6.5a | 88.8 ± 3.6a | 89.3 ± 5.3a | 78.6 ± 10.4a |
| SF-4 (1.5% Binder G) | 90.1 ± 3.7a | 88.2 ± 4.0a | 90.2 ± 4.5a | 86.1 ± 4.1a |
| SF-5 (3.0% Wheat Gluten) | 92.8 ± 4.5a | 92.2 ± 3.7a | 91.3 ± 4.5a | 83.2 ± 5.6a |

These results indicate that the Shrimp feed formulations produced using the Binder of the present invention (Binder G) had comparable pellet stability to the other feed formulations made with commercially available binders.

EXAMPLE 3

Three of the shrimp teed formulations SF-1, SF-2 and SF-4 described in Example 2 were used in a shrimp feeding study.

15 tanks of Penaeus Vannamei shrimp were used in the study. Each tank contained approximately 12 shrimp. At the beginning of the study, the average weight of the shrimp in each tank was determined.

The tanks were divided into three sets of five. Each set of five tanks was fed a different shrimp feed formulation, SF-1, SF-2 or SF-4 as the sole source of food for the tank of shrimp. The shrimp feed was provided to the shrimp in the tank twice in an 8 hour period. Approximately 0.15 grams of shrimp feed was provided to each shrimp at each feeding. The water temperature of each tank was maintained between 23° and 28° C. and the shrimp were visually observed on a daily basis.

The survival rate and weight of the shrimp in each tank were measured at the beginning of the study and after 2, 4 and 6 weeks. The Feed Conversion Rate (FCR) was also determined for each tank. The results are set forth in Table 4.

These results indicate that the shrimp feed formulations produced using the binder of the present invention are advantageous for feeding shrimp in comparison with shrimp feed formulations produced using a typical prior art binder.

It is to be understood that the above description of the present invention is susceptible to various modifications, changes, and adaptations by those skilled in the art, and that the same are to be considered to be within the scope of the present invention.

TABLE 4

| | Initial | 2 weeks | 4 weeks | 6 weeks |
|---|---|---|---|---|
| SF-1 (Pel-plus 250A) | | | | |
| survival | 100% | 96.6 ± 0.05% | 96.6 ± 0.05% | 90.0 ± 7.0% |
| weight/shrimp | | 2.02 ± 0.09 g | 2.69 ± 0.17 g | 3.29 ± 0.28 g |
| weight increase/shrimp | 0 | 0.87 ± 0.05 g | 0.67 ± 0.13 g | 0.59 ± 0.15 g |
| FCR | — | 1.86 ± 0.12 | 2.67 ± 0.49 | 4.55 ± 1.31 |
| SF-2 (0.5% Binder G) | | | | |
| survival | 100% | 96.6 ± 0.05% | 96.6 ± 0.05% | 96.6 ± 0.05% |
| weight/shrimp | | 1.92 ± 0.07 g | 2.68 ± 0.19 g | 3.36 ± 0.29 g |
| weight increase/shrimp | 0 | 0.84 ± 0.04 g | 0.75 ± 0.15 g | 0.68 ± 0.14 g |
| FCR | — | 1.90 ± 0.09 | 2.48 ± 0.30 | 3.70 ± 0.67 |
| SF-4 (1.5% Binder G) | | | | |
| survival | 100% | 96.7 ± 0.08% | 96.7 ± 0.08% | 91.7 ± 6.8% |
| weight/shrimp | | 1.93 ± 0.17 g | 2.69 ± 0.17 g | 3.78 ± 0.08 g |
| weight increase/shrimp | 0 | 0.83 ± 0.10 g | 0.74 ± 0.36 g | 0.91 ± 0.03 g |
| FCR | — | 1.96 ± 0.24 | 5.14 ± 0.41 | 2.97 ± 0.20 |

What is claimed is:

1. A binder composition for pelleted and compressed dry aquatic animal feed comprising:
   10–17%, by weight a feed grade reactive metal source;
   25–35%, by weight, a feed grade reactive metal oxide or hydroxide;
   18–28%, by weight, sugar and
   28–42%, by weight, corn syrup solids;
wherein the binder composition includes calcium in an amount such that the calcium contribution to the aquatic animal feed is not greater than 0.066%, by weight, per 0.5% by weight of the binder composition incorporated into the aquatic animal feed.

2. The binder composition of claim 1 wherein the percentage by weight of the reactive metal source is between 14 and 17, the percentage by weight of the reactive metal oxide or hydroxide is between 28 and 34, the percentage by weight sugar is between 20 and 25 and the percentage by weight corn syrup solids is between 29 and 35.

3. The binder composition of claim 1 wherein the percentage by weight of the reactive metal source is 16, the percentage by weight of the reactive metal oxide or hydroxide is 32, the percentage by weight sugar is 22 and the percentage by weight corn syrup solids is 30.

4. The binder composition of claim 1, 2 or 3 wherein the reactive metal source is selected from the group consisting of calcium chloride, magnesium chloride, potassium magnesium sulfate, potassium sulfate, magnesium sulfate or mixtures thereof and the reactive metal oxide or hydroxide is selected from the group consisting of calcium magnesium oxide, calcium oxide, magnesium oxide, magnesium hydroxide, calcium hydroxide and magnesium calcium hydroxide.

5. An aquatic animal feed composition comprising ingredients selected from the group consisting of: ground dry food meals, minerals, vitamins, drug additives or mixtures thereof and a binder comprising:
   10–17%, by weight a feed grade reactive metal source;
   25–35%, by weight, a feed grade reactive metal oxide or hydroxide;
   18–28%, by weight, sugar and
   28–42%, by weight, corn syrup solids wherein the binder composition includes calcium in an amount such that the calcium contribution to the aquatic animal feed attributable to the binder is not greater than 0.066%, by weight, per 0.5% by weight of the binder incorporated into the aquatic animal feed.

6. The aquatic animal feed composition of claim 5 wherein the percentage by weight of the binder composition is between 0.1 and 2.5.

7. The feed composition of claim 5 wherein the percentage by weight of the reactive metal source is 0.025 to 0.425, the percentage by weight of the reactive metal oxide or hydroxide is 0.0125 to 0.875, the percentage by weight sugar is 0.09 to 0.70 and the percentage by weight corn syrup solids is 0.14 to 1.05.

8. The feed composition of claim 5, 6 or 7 wherein the reactive metal source is selected from the group consisting of calcium chloride, magnesium chloride, potassium magnesium sulfate, potassium sulfate, magnesium sulfate or mixtures thereof and the reactive metal oxide or hydroxide is selected from the group consisting of calcium magnesium oxide, calcium oxide, magnesium oxide, magnesium hydroxide, calcium hydroxide and magnesium calcium hydroxide.

9. The binder composition of claim 2 wherein the reactive metal source is potassium magnesium sulfate and the reactive metal oxide is dolime.

10. The animal feed composition of claim 8 wherein the calcium level of the feed is not greater than 0.33% by weight, and the magnesium level of the feed is not greater than 0.26%, by weight.

* * * * *

UNITED STATES PATENT AND TRADEMARK OFFICE
CERTIFICATE OF CORRECTION

PATENT NO. : 5,378,471
DATED : January 3, 1995
INVENTOR(S) : David Morgan Smith

It is certified that error appears in the above-indentified patent and that said Letters Patent is hereby corrected as shown below:

Column 1, line 49, "teed" should read --feed--.

Column 2, line 63, "39-35%" should read --29-35%--.

Column 3, line 31, "dolomite" should read --dolomitic--.

Column 4, line 37, "raids" should read --mids--; line 65, "teed" should read --feed--.

Column 5, line 22, "gives" should read --Knives--; line 23, "densifted" should read --densified--; line 36, "advantageous" should read --advantages--; line 52 in Table 1, "27.5 gram" should read --27.5 grams--; line 53 in Table 1, "12.5 gram" should read --12.5 grams--; line 66, "Test" should read --Tests--; line 68, "tests" should read --feeds--.

Column 6, line 21, "teed" should read --feed--.

Column 8, line 5, "teed" should read --feed-; line 14, "teed" should read --feed--; line 46, "menaguinone" should read --menaquinone--; line 53, "21.4:" should read --21.4;--; line 56, "teed" should read --feed-; line 57, "aleionized" should read --deionized--; line 59, "aleionized" should read --deionized--.

UNITED STATES PATENT AND TRADEMARK OFFICE
CERTIFICATE OF CORRECTION

PATENT NO. : 5,378,471
DATED : January 3, 1995
INVENTOR(S) : David Morgan Smith

It is certified that error appears in the above-indentified patent and that said Letters Patent is hereby corrected as shown below:

Column 9, line 8, "teed" should read --feed--; line 60, "teed" should read --feed--.

Column 11, line 24, "food" should read --feed--; line 28, "Iced" should read --feed--.

Signed and Sealed this

Twentieth Day of February, 1996

Attest:

BRUCE LEHMAN

*Attesting Officer*     *Commissioner of Patents and Trademarks*